United States Patent [19]

Adachi et al.

[11] Patent Number: 5,509,013
[45] Date of Patent: Apr. 16, 1996

[54] MULTIPLEXER CONTROL SYSTEM

[75] Inventors: Makoto Adachi; Tetsuo Tachibana, both of Kawasaki, Japan

[73] Assignee: Fujitsu Limited, Kanagawa, Japan

[21] Appl. No.: 220,271

[22] Filed: Mar. 30, 1994

[30] Foreign Application Priority Data

Sep. 1, 1993 [JP] Japan .................................. 5-217117

[51] Int. Cl.$^6$ ........................................................ H04J 3/22
[52] U.S. Cl. ................................................ 370/84; 370/112
[58] Field of Search .............................. 370/84, 112, 111, 370/108, 101, 100, 91, 49, 48, 119; 381/2, 6, 10, 19, 80, 81; 358/14, 15, 185; 340/825.03, 825.14, 825.2, 825

[56] References Cited

U.S. PATENT DOCUMENTS

| | | | |
|---|---|---|---|
| 4,752,923 | 6/1988 | Allen et al. | 370/84 |
| 4,939,729 | 7/1990 | Weisser | 370/112 |
| 4,949,339 | 8/1990 | Shimada et al. | 370/84 |
| 5,117,417 | 5/1992 | Danner | 370/84 |
| 5,327,422 | 7/1994 | Abefelt et al. | 370/112 |

*Primary Examiner*—Douglas W. Olms
*Assistant Examiner*—Ajit Patel

[57] ABSTRACT

A multiplexer control system is used to control multiplexing of data of a plurality of channels including channels having different transmission speeds. The multiplexer control system includes a bit map memory storing, in a bit map format, bits indicating existence of output timings respectively corresponding to different transmission speeds, a rate setting memory in which identification numbers indicating the transmission speeds are set in correspondence with the channels, and a controlling part for outputting an output timing signal depending on the transmission speed of the corresponding channel, based on the bit which indicates the existence of the output timing and is read by making access to the bit map memory and the identification number read by making access to the rate setting memory. The output timing signal determines the multiplexing of the data of the plurality of channels.

6 Claims, 5 Drawing Sheets

FIG.4

IDENTIFICATION NUMBER

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 1 |
| 1 | 0 | 0 | 0 | 0 | 0 | 0 | 1 | 1 |
| 2 | 0 | 0 | 0 | 0 | 0 | 0 | 0 | 1 |
| 3 | 0 | 0 | 0 | 0 | 0 | 0 | 1 | 1 |
| 4 | 0 | 0 | 0 | 0 | 0 | 0 | 0 | 1 |
| 5 | 0 | 0 | 0 | 0 | 0 | 1 | 1 | 1 |
| 6 | 0 | 0 | 0 | 0 | 0 | 0 | 0 | 1 |
| ⋮ | | | | ⋮ | | | | |
| 62 | 0 | 0 | 0 | 0 | 0 | 0 | 0 | 1 |
| 63 | 1 | 1 | 1 | 1 | 1 | 1 | 1 | 1 |

↑ 4K  ↑ 8K  ↑ 16K  ↑ 32K  ↑ 48K  ↑ 56K  ↑ 128K  ↑ 256K

↑

ADDRESS

MULTIPLEXER CONTROL SYSTEM

BACKGROUND OF THE INVENTION

The present invention generally relates to multiplexer control systems, and more particularly to a multiplexer control system for multiplexing data of a plurality of channels including channels having different transmission speeds.

Various known multiplexing methods such as bit multiplexing or byte multiplexing are employed to multiplex data of a plurality of channels. When multiplexing data of channels having different transmission speeds, data of channels having higher transmission speeds are more frequently multiplexed than data of channels having lower transmission speeds. There are demands to economically realize a construction capable of multiplexing data on channels having different transmission speeds.

FIG. 1 shows a conventional construction adapted for multiplexing data on channels having different transmission speeds, in which a multiplexer 51, a channel specifying part 52, a selector 53, an output timing signal generating circuit 54, a frequency dividing circuit 55 and a basic clock generating circuit 56 are provided. The basic clock generated by the basic clock generating circuit 56 is frequency divided by the frequency dividing circuit 55. Based on the frequency divided output signal, the output timing signal generating circuit 54 generates output timing signals depending on the transmission speeds of channels CH1 through CHn.

The channel specifying part 52 supplies a channel specifying signal for specifying the channels CH1 through CHn to the selector 53 and the multiplexer 51. The selector 53 selects an output timing signal depending on the channel specifying signal and outputs. the selected output timing signal to the multiplexer 51. The multiplexer 51 selects the data of the channels CH1 through CHn specified by the channel specifying signal and multiplexes the selected data depending on the output timing signal. In this way, it is possible to multiplex data of a plurality of channels including channels having different transmission speeds.

In case the transmission speed of the channels CH1 through CHn is to be changed, it can be dealt with by modifying the construction of the selector 53 so as to change the corresponding relationship between the channel specifying signals and the output timing signals. The addition or deletion of a channel is dealt with by changing the channel specifying signal output from the channel specifying part 52. There is also a known construction wherein the selector 53 is omitted, and the output timing signals corresponding to the transmission speeds of the channels CH1 through CHn are distributed to the respective channels CH1 through CHn.

The asynchronous transfer mode (ATM) makes transmission in units of a 53 byte fixed length cell made up of a 5-byte header portion and a 48-byte data portion. The cells of the channels CH1 through CHn are multiplexed by the multiplexer 51 depending on the respective transmission speeds of the channels CH1 through CHn. The cells of a plurality of channels, including channels having different transmission speeds, are multiplexed so that cells of a channel having a higher transmission speed are multiplexed more frequently than cells of a channel having a lower transmission speed.

In the above described cell multiplexing, the output timing signal generating circuit 54 generates an output timing signal indicating the transmission timing of the cell in correspondence with the transmission speed. The period of the output timing signals for the channels having a high transmission speed is short, and the period of the timing signals for the channels having a low transmission speed is long.

In the conventional multiplexer control system for multiplexing data of a plurality of channels including channels having different transmission speeds, the output timing signal generating circuit 54 generates the output timing signal corresponding to the transmission speed based on a signal which is obtained by frequency dividing the basic clock signal by the frequency dividing circuit 55. Hence, there is a drawback in that as the number of channels and the number of kinds of transmission speeds increase, the circuit scale of the frequency dividing circuit 55 and the output timing signal generating circuit 54 becomes large. In addition, the number of the interconnecting wirings becomes large, resulting in an increase in the cost of the system.

SUMMARY OF THE INVENTION

Accordingly, a general object of the present invention is to provide a novel and useful multiplexer control system in which the problems described above are eliminated.

Another and more specific object of the present invention is to provide a multiplexer control system for controlling multiplexing of data of a plurality of channels including channels having different transmission speeds, comprising a bit map memory storing, in a bit map format, bits indicating existence of output timings respectively corresponding to different transmission speeds, a rate setting memory in which identification numbers indicating the transmission speeds are set in correspondence with the channels, and controlling means for outputting an output timing signal depending on the transmission speed of the corresponding channel, based on the bit which indicates the existence of the output timing and is read by making access to the bit map memory and the identification number read by making access to the rate setting memory, where the output timing signal determines the multiplexing of the data of the plurality of channels. According to the multiplexer control system of the present invention, it is possible to minimize the increase of the number of components and signal lines even when the number of channels and the number of kinds of transmission speeds are large. In addition, the present invention can easily cope with the addition or deletion of a channel as well as the change in the transmission speed of the channel by employing a rewritable memory.

Other objects and further features of the present invention will be apparent from the following detailed description when read in conjunction with the accompanying drawings.

BRIEF DESCRIPTION OF THE DRAWINGS

FIG. 4 is a diagram for explaining a bit map memory; and

DESCRIPTION OF THE PREFERRED EMBODIMENTS

First, a description will be given of the operating principle of the present invention, by referring to FIG.

Figure 1:
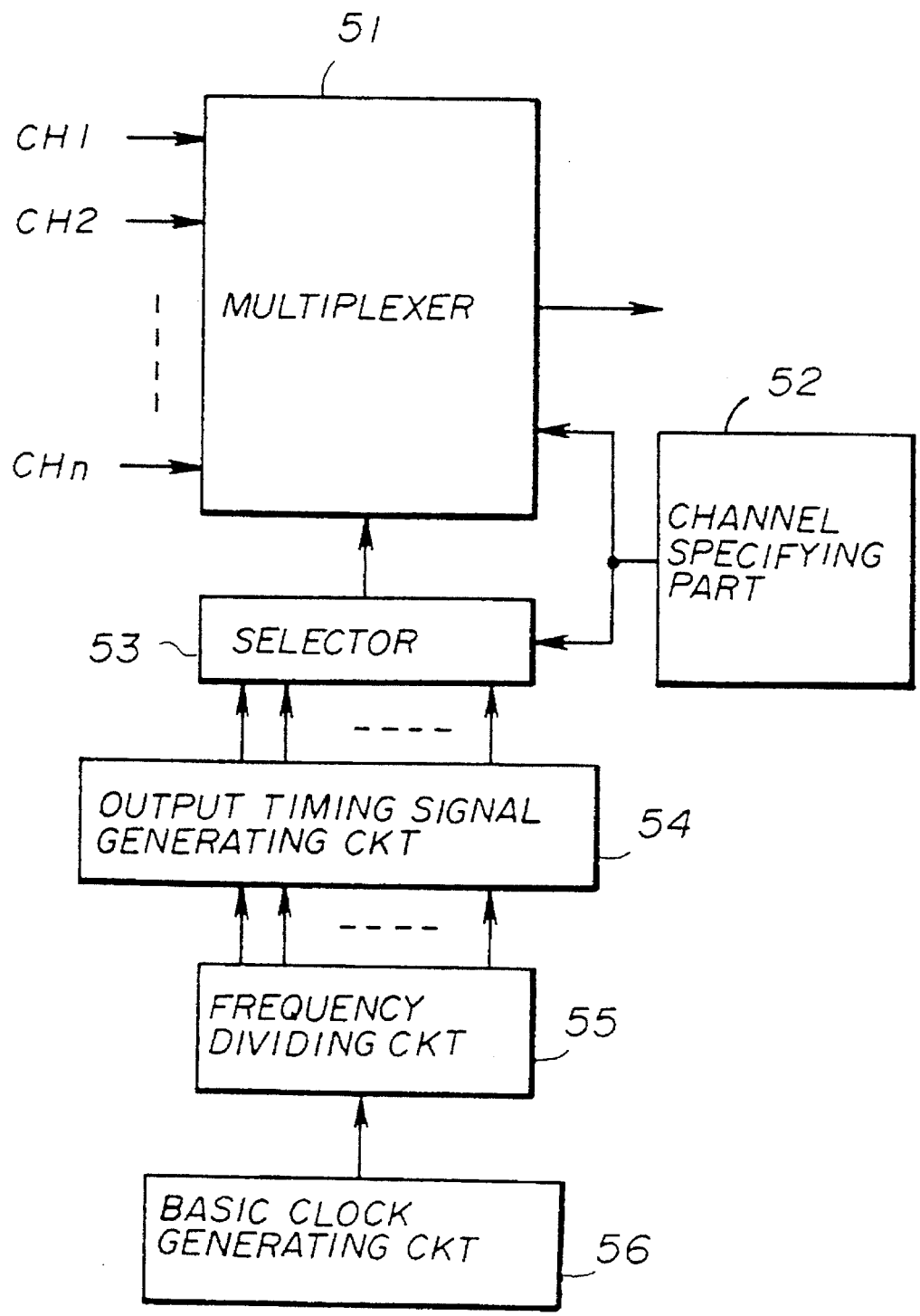
FIG. 1 is a system block diagram showing a conventional system for multiplexing data of channels having different transmission speeds.
Figure 2:
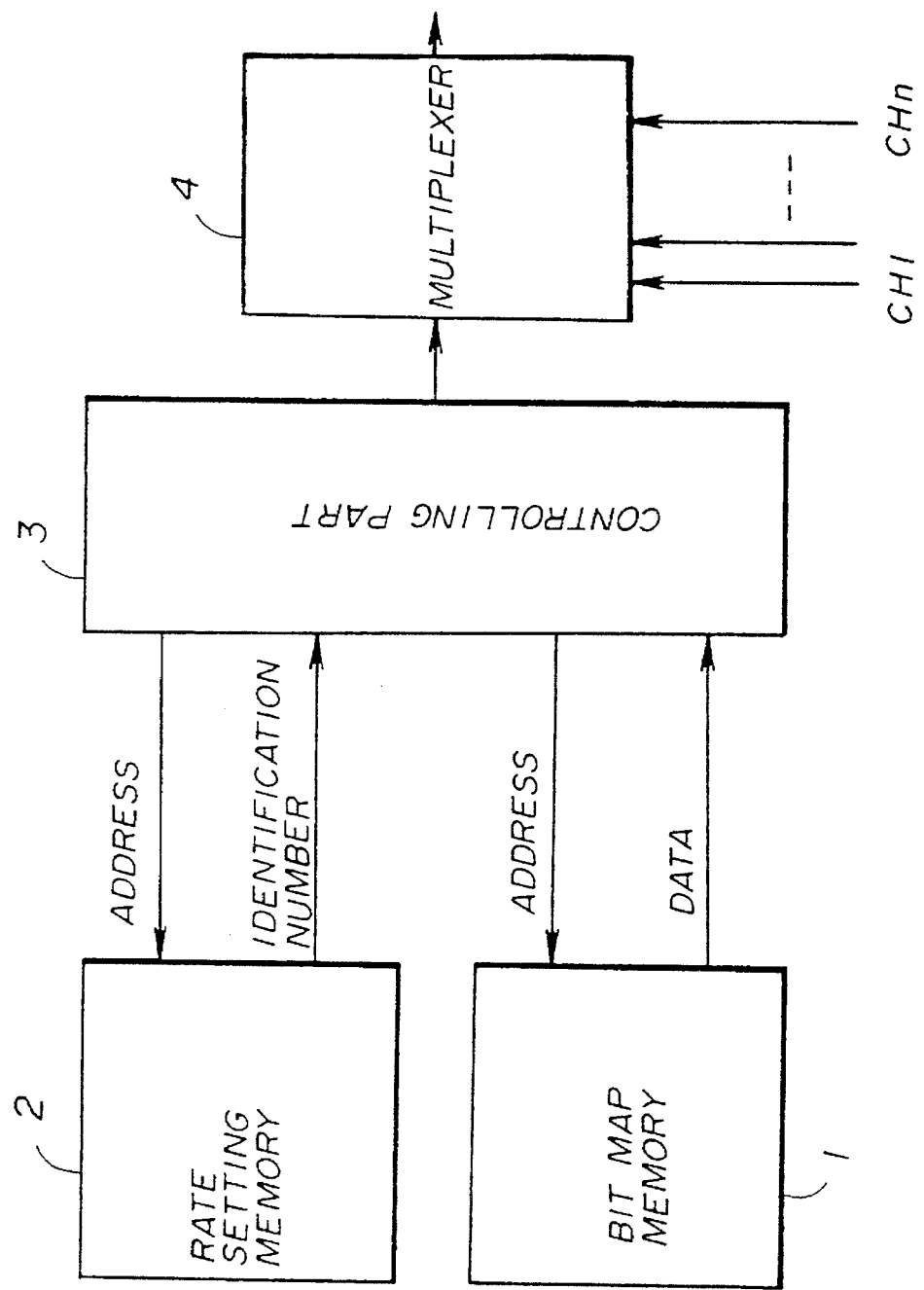
FIG. 2 is a block diagram for explaining the operating principle of the present invention.

FIG. 2 is a block diagram for explaining the operating principle of the present invention. As shown in FIG. 2, the multiplexer control system of the present invention comprises a bit map memory 1 which stores, in a bit map format, bits indicating the existence of output timings in correspondence with different transmission speeds, a rate setting memory 2 in which identification numbers indicating the transmission speeds are set in correspondence with channels CH1 through CHn, and a controlling part 3 for outputting an output timing signal depending on the transmission speed of each of the channels CH1 through CHn, based on the bit which indicates the existence of the output timing and is read by making access to the bit map memory 1 and the identification number read by making access to the rate setting memory 2. Data in each channel are multiplexed in the multiplexer 4 depending on the output timing signals output from the controlling part 3.

The bit map memory 1 includes a number of addresses depending on the ratio of the maximum transmission speed and the minimum transmission speed used in the channels CH1 through CHn. Each address has a bit configuration corresponding to the kind of transmission speed. With respect to the maximum transmission speed, all addresses store the bit which indicates that the output timing exists. On the other hand, with respect to other transmission speeds, the bit indicating that the output timing exists is stored at each address depending on the ratio of the transmission speed with respect to the maximum transmission speed.

The controlling part 3 reads from the bit map memory 1 a bit string indicating the existence of the output timings from successively increasing addresses and latches the read bit string. In addition, the controlling part 3 also reads from the rate setting memory 2 an identification number indicating the transmission speed from an address corresponding to the channel. Based on the result of decoding the read identification number data, 1 bit is selected from the bit string indicating the existence of the output timing. When the selected bit indicates that the output timing exists, the controlling part 3 outputs an output timing signal and supplies the same to the multiplexer 4.

The bit map memory 1 arranges the bits indicating the existence of the output timings depending on the time sequence, and this arrangement of the bits indicating the existence of the output timings is made depending on the kinds of transmission speeds. For example, when 8 kinds of transmission speeds are used, a bit string having a 8-bit configuration indicating the existence of the output timings in correspondence with the addresses is read out from the bit map memory 1. Each transmission speed is set in the rate setting memory 2 as the identification number in correspondence with the channels CH1 through CHn. For example, the same identification number is set with respect to the channels having the same transmission speed. The controlling part 3 reads the bit string indicating the existence of the output timings from the bit map memory 1 from successively increasing addresses of the bit map memory 1. In addition, the controlling part 3 also reads the identification numbers in correspondence with the channels from the rate setting memory 2 from successively increasing addresses of the rate setting memory 2. The controlling part 3 then determines whether or not the output timing exists with respect to the transmission speed which corresponds to the read identification number. When it is determined that the output timing exists for this identification number, the controlling part 3 supplies the output timing signal to the multiplexer 4. Hence, the data of the channel at this point in time are multiplexed and transmitted.

In the case where the maximum transmission speed of the channels CH1 through CHn is 256 kbps and the minimum transmission speed is 4 kbps, the number of addresses of the bit map memory 1 is 64. In addition, at the bit position corresponding to the maximum transmission speed, the bit which indicates that the output timing exists is stored for all of the 64 addresses. At the bit position corresponding to the minimum transmission speed, the bit which indicates that the output timing exists is .stored for only one of the 64 addresses. In other words, bit strings indicating the existence of the output timings with respect to different transmission speeds are read out from each of the addresses. Hence, the bit indicating that the output timing exists is read out with a period corresponding to the transmission speed.

The controlling part 3 has the function of making access to the bit map memory 1 and the rate setting memory 2. The controlling part 3 latches the bit string which is read from the bit map memory 1 and depends on the number of kinds of transmission speeds. The controlling part 3 also selects one of the bits in the latched bit string based on the result of decoding the identification number which is read from the rate setting memory 2 in correspondence with the channels. In case of the maximum transmission speed, the selected bit indicates that the output timing exists, and the controlling part 3 supplies the output timing signal to the multiplexer 4. Accordingly, the data of the channel corresponding to the address of the rate setting memory 2 from which the identification number is read are multiplexed and transmitted.

Next, a description will be given of an embodiment of the multiplexer control system according to the present invention.

Figure 3:
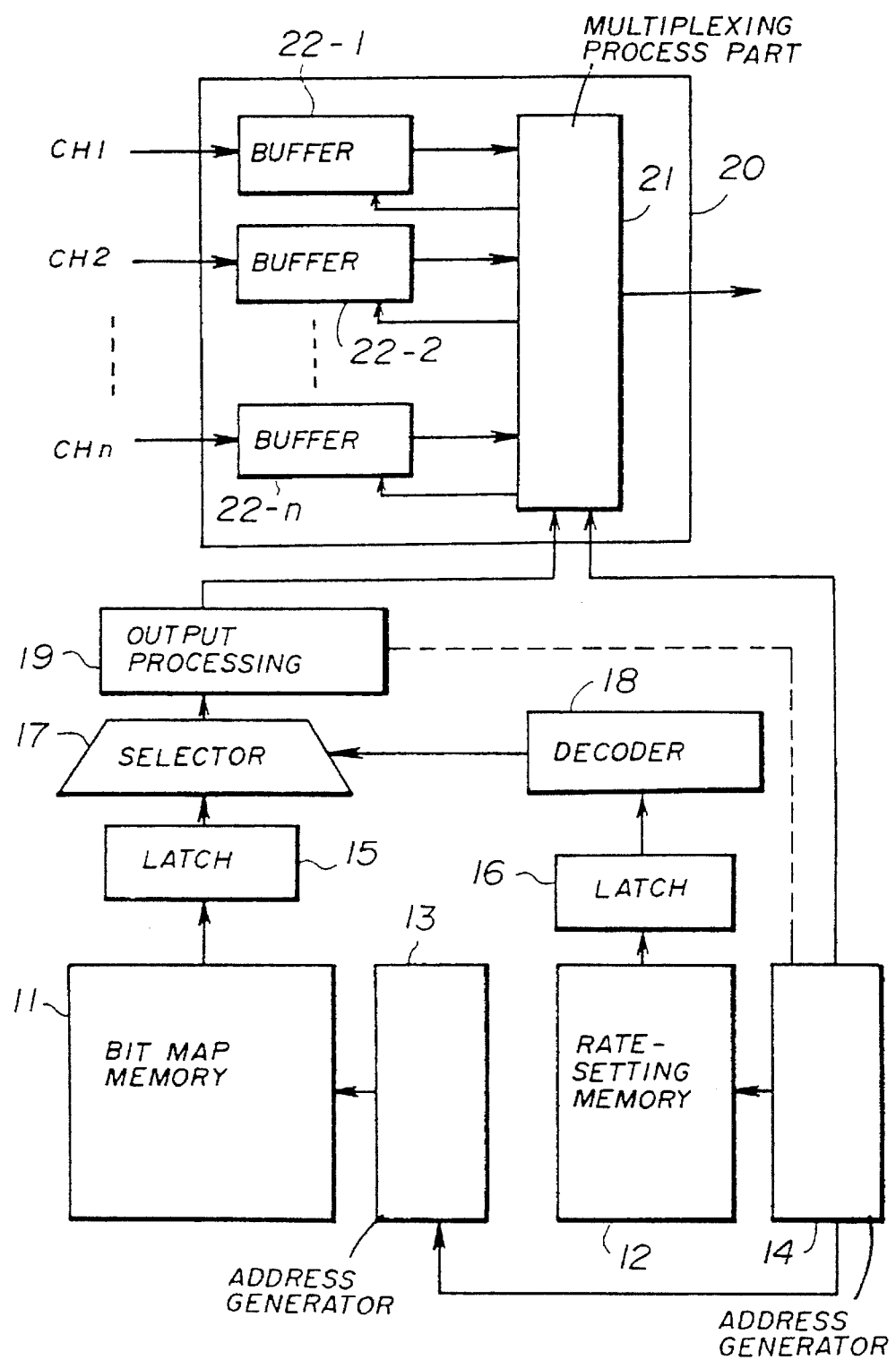
FIG. 3 is a system block diagram showing an embodiment of the multiplexer control system according to the present invention.

FIG. 3 shows the embodiment of the multiplexer control system according to the present invention. The multiplexer control system shown in FIG. 3 comprises a bit map memory 11, a rate setting memory 12, address generators 13 and 14, latch circuits 15 and 16, a selector 17, a decoder 18, an output processing part 19, a multiplexer 20, a multiplexing process part 21, and buffers 22-1 through 22-n. The controlling part 3 shown in FIG. 2 includes the address generators 13 and 14, the latch circuits 15 and 16, the selector 17 and the decoder 18 shown in FIG. 3.

The data of the channels CH1 through CHn are supplied to the multiplexing process part 21 via the respective buffers 22-1 through 22-n of the multiplexer 20. After the data are multiplexed, they are transmitted via a transmission line, for example. An access is made to the bit map memory 11 by an address signal output from the address generator 13, and a read bit string is latched by the latch circuit 15. An access is made to the-rate setting memory 12 by an address signal output from the address generator 14, and a read identification number is latched by the latch circuit 16.

For example, when it is assumed that there are 8 kinds of transmission speeds, namely, 4 kbps, 8 kbps, 16 kbps, 32 kbps, 48 kbps, 56 kbps, 128 kbps and 256 kbps as shown in FIG. 4, identification numbers of 1 through 8 are used in the bit map memory 11 for these transmission speeds. Since the ratio between the maximum transmission speed and the minimum transmission speed is 64, addresses 0 through 63 are used. In other words, the bit ("1") indicating that the output timing for the identification number 1 having the transmission speed of 4 kbps exists is stored at only the address 63 out of the addresses 0 through 63. The bit ("1") indicating that the output timing of the identification number 2 having the transmission speed of 8 kbps exists is stored at the addresses 31 and 63. The bit ("1") indicating that the output timing of the identification number 7 having the transmission speed of 128 kbps exists is stored at every other (or every second) addresses. The bit ("1") indicating that the output timing of the identification number 8 having the transmission speed of 256 kbps exists is stored at all of the addresses 0 through 63. A bit "0" indicates that the output timing does not exist.

The identification numbers are set in the rate setting memory 12 at addresses corresponding to the channels CH1 through CHn. For example, if it is assumed that the transmission speed of the channel CH1 is 8 kbps, the transmission speed of the channel CH2 is 4 kbps, and the transmission speed of the channel CH3 is 128 kbps, the identification number 2 is set at the address in the rate setting memory 12 corresponding to the channel CH1, the identification number 1 is set at the address corresponding to the channel CH2, and the identification number 7 is set at the address corresponding to the channel CH3.

The bit string indicating the existence of the output timing is read from the bit map memory 11 in response to the address signal from the address generator 13 and is latched in the latch circuit 15. For example, the bit string read from the address 0 of the bit map memory 11 has the 8-bit configuration "00000001", and is latched in the latch circuit 15. In addition, the identification number corresponding to the channel is read from the rate setting memory 12 in response to the address signal from the address signal generating part 14, and is latched in the latch circuit 16. For example, the identification number 2 for the channel CH1 is read and latched in the latch circuit 16 and is decoded by the decoder 18. The selector 17 is controlled based on the result of the decoding made in the decoder 18 so as to selectively output the second bit in the latch circuit 15. The selected second bit output from the selector 17 is supplied to the output processing part 19. In this case, since the selected second bit is "0" and indicates that the output timing does not exist, the address is immediately incremented in the address generator 14, and no output timing signal is supplied to the multiplexer 20.

Next, the identification number 1 for the channel CH2 is read from the rate setting memory 12 In response to the address signal from the address generator 14, latched in the latch circuit 16, and decoded in the decoder 18. The selector 17 is controlled based on the decoded result of the decoder 18 so as to selectively output the first bit in the latch circuit 15. The selected first bit is supplied to the output processing part 19. In this case, since the selected first bit is "0" and indicates that the output timing does not exist, the address is immediately incremented in the address generator 14, and no output timing signal is supplied to the multiplexing unit 20.

The above described operation is similarly continued up to the channel CHn, and the address in the address generator 13 is thereafter incremented. As a result, the bit string having the 8-bit configuration "00000011" is read from the address 1 of the bit map memory 11 and is latched in the latch circuit 15.

Then, the identification number 2 for the channel CH1 is read again from the rate setting memory 12. The selector 17 is controlled based on the decoded result of the decoder 18 so as to selectively output the second bit of the in the latch circuit 15. The selected second bit is supplied to the output processing part 19. In this case, since the selected second bit is also "0" and indicates that the output timing does not exist, the address in address generator 14 is immediately incremented. In response to the address signal from the address generator 14, the identification number 1 for the next channel CH2 is read from the rate setting memory 12. The selector 17 is controlled based on the decoded result of this identification number 1 so as to selectively output the first bit in the latch circuit 15. Since the selected first bit is also "0" in this case and indicates that the output timing does not exist, the address in the address generator 14 is immediately incremented.

Next, the identification number 7 for the channel CH3 is read from the rate setting memory 12. The selector 17 is controlled based on the decoded result of the identification number 7 so as to selectively output the seventh bit in the latch circuit 15. Since the selected seventh bit is "1" and indicates that the output timing exists, the output processing part 19 supplies an output timing signal to the multiplexer 20. In addition, because the address signal indicating the channels CH1 through CHn is supplied from the address generator 14 to the multiplexing processor 21, the multiplexing processor 21 selects the buffers 22-1 through 22-n in correspondence with the channels CH1 through CHn specified by the address signal and supplies the output timing signal thereto. In the this case, the output timing signal is supplied to the buffer 22-3 (not shown in the figure) corresponding to the channel CH3. Thus, one block of data such as ATM cells are output from this buffer 22-3 and multiplexed by the multiplexing processor 21. The address of the address generator 14 is then incremented.

When the bit string having the 8-bit configuration "11111111" is read from the address 63 of the bit map memory 11 in response to the address signal from the address generator 13 and is latched in the latch circuit 15, all of the bits are "1" indicating that the output timing exists with respect to the identification numbers corresponding to the channels CH1 through CHn. Thus, the output timing signals are supplied from the output processing part 19 to the multiplexing processor 21 in correspondence with the channels CH1 through CHn. Accordingly, the multiplexing processor 21 supplies the timing signals to the buffers 22-1 through 22-n corresponding to the channels CH1 through CHn, so that one block of data such as the cells of the channels CH1 through CHn are successively multiplexed and transmitted from the multiplexer 20.

Figure 5:
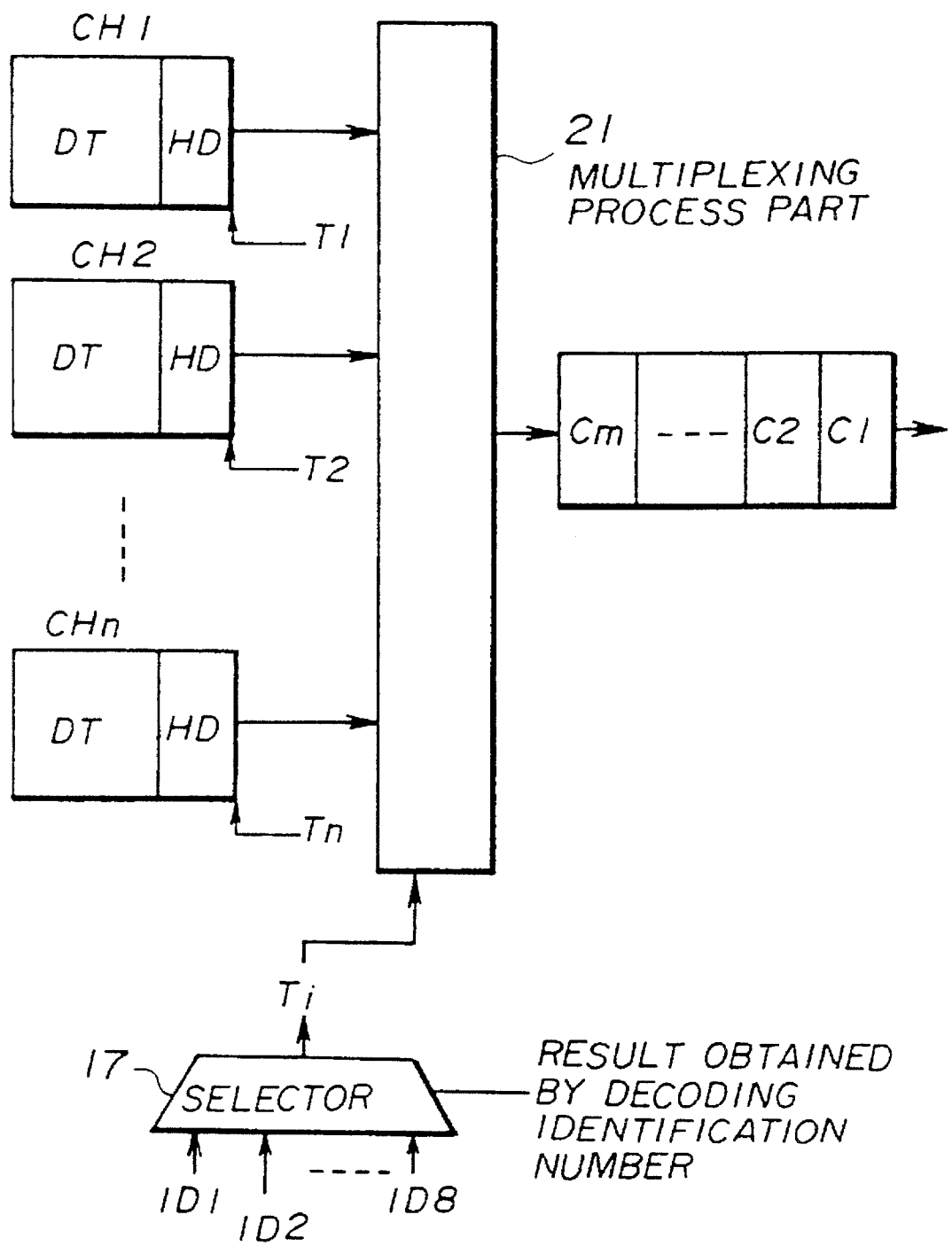
FIG. 5 is a system block diagram for explaining cell multiplexing in the embodiment.

FIG. 5 is a diagram for explaining the multiplexing of the cells in the above described embodiment. In FIG. 5, those parts that are the same as those corresponding parts in FIG. 3 are designated by the same reference numerals, and a description thereof will be omitted. As mentioned above, cells in the asynchronous transfer mode (ATM) has a fixed length of 53 bytes and consists of a 5-byte header portion HD and a 48-byte data portion DT. The cells of the channels CH1 through CHn are multiplexed by the multiplexing processor 21 depending on output timing signals T1 through Tn so that cells C1, C2 . . . Cm are multiplexed as shown.

In this case, bits ID1 through ID8 corresponding to the identification numbers 1 through 8, which are read from the bit map memory 11 and latched in the latch circuit 15, are supplied to the selector 17. Further, the identification number corresponding to the channels CH1 through CHn is decoded by the decoder 18, and the decoded result is supplied to the selector 17. The bits ID1 through ID8 corresponding to the identification numbers are selected depending on the decoded result of the identification number. When the selected bit indicates that the output timing exists, the output timing signal Ti is supplied to the multiplexing processor 21, where i=1, ..., 8 in this case.

The multiplexing processor 21 is supplied with the address signal specifying the channels CH1 through CHn and the output timing signal Ti, and supplies the output timing signal Ti with respect to the channel specified by the address signal so as to multiplex the cells of the specified channel. For example, when the address signal specifies the channel CH3 and the output timing signal Ti is output, the multiplexing processor 21 supplies the timing signal T3 with respect to the channel CH3 so as to multiplex the cells of the channel CH3.

When 8 kinds of transmission speeds are provided and the ratio between the maximum transmission speed and the minimum transmission speed is 64, and if it assumed that the transmission speed of the channel CH1 is 8 kbps, the transmission speed of the channel CH2 is 4 kbps and the transmission speed of the channel CH3 is 128 kbps as in the above described case, the 64 cells C1 through C64 which are multiplexed include 2 cells of the channel CH1, 1 cell of the channel CH2 and 32 cells of the channel CH3. The remaining 29 cells are allocated in correspondence, with the transmission speeds of the other channels.

The bit map memory 11 may be formed by a random access memory (RAM) or various types of read only memories (ROMs). When the bit map memory 11 is formed by the RAM or an electrically programmable ROM (EPROM), it is easy to cope with the change in the transmission speed or the like. The rate setting memory 12 may also be formed by a RAM or various types of ROMs. When the rate setting memory 12 is formed by the RAM or the EEPROM, it is possible, even after the system is started, to cope with various situations such as the addition or deletion of a channel as well as the change in the transmission speed of a channel, by changing the identification number corresponding to the channel.

In addition, when multiplexing the data of the channels CH1 through CHn having various transmission speeds in the form of cells by the multiplexer 20, the timing with which the cells are formed can be determined by the output timing signals. Moreover, the present invention can also be applied to a byte multiplexing wherein the multiplexing is carried out in blocks.

As described above, the multiplexer control system according to the present invention includes the bit map memory 1 which stores, in a bit map format, bits indicating the existence of the output timings, the rate setting memory 2 in which identification numbers indicating the transmission speeds are set in correspondence with the channels CH1 through CHn, and the controlling part 3. The output timing signals corresponding to the transmission speeds of the channels CH1 through CHn are supplied to the multiplexer 4, and the data of the channels CH1 through CHn are multiplexed. Hence, it is possible to minimize the increase of the number of components and signal lines even when the number of channels and the number of kinds of transmission speeds are large. In addition, the present invention can easily cope with the addition or deletion of a channel as well as the change in the transmission speed of the channel by employing a rewritable memory.

Furthermore, the memory capacity or the number of addresses to be provided in the bit map memory 1 is only the ratio of the maximum transmission speed and the minimum transmission speed, and thus, the memory capacity of the bit map memory may be relatively small. For this reason, it is possible to easily form various parts including the bit map memory 1 in the form of an integrated circuit. As a result, it is possible to reduce the size of the multiplexer control system.

Moreover, the controlling part 3 selects the bits of the bit string read from the bit map memory 1 depending on the decoded results of the identification number read from the rate setting memory. If the selected 1 bit indicates that the output timing exists, the controlling part 3 supplies the output timing signal to the multiplexer 4. The multiplexer 4 can thus easily multiplex the data of the channels CH1 through Chn based on the output timing signal and the signal which specifies the channel.

Further, the present invention is not limited to these embodiments, but various variations and modifications may be made without departing from the scope of the present invention.

What is claimed is:

1. A multiplexer control system for controlling multiplexing of input data of a plurality of channels including channels having different transmission speeds, said multiplexer control system comprising:

a bit map memory having addresses storing, in a bit map format, bits indicating output timings respectively corresponding to different transmission speeds;

a rate setting memory having addresses at which identification numbers indicating the different transmission speeds are set in correspondence with said channels; and controlling means for outputting an output timing signal depending on the transmission speed of a corresponding channel, based on a bit which indicates the output timing of the corresponding channel and the identification number which indicates the transmission speed of the corresponding channel, said controlling means reading said bit and said identification number by respectively making access to said bit map memory and said rate setting memory, said output timing signal determining the multiplexing of the input data of the plurality of channels.

2. The multiplexer control system as claimed in claim 1, which further comprises a multiplexer, coupled to said controlling means, multiplexing the input data of the plurality of channels based on the output timing signal from said controlling means.

3. The multiplexer control system as claimed in claim 1, wherein said bit map memory includes a number of addresses depending on a ratio of a maximum transmission speed and a minimum transmission speed of said channels, each of said addresses having a bit configuration corresponding to the transmission speeds, said bit map memory storing with respect to the maximum transmission speed a bit-indicating that the output timing exists at all of the addresses and storing with respect to other transmission speeds the bit indicating that the output timing exists at each address depending on a ratio of each of said other transmission speeds with respect to the maximum transmission speed.

4. The multiplexer control system as claimed in claim 1, wherein said controlling means reads, from successively increasing addresses of said bit map memory, a bit string indicating the output timings and latches the read bit string, and reads from addresses corresponding to the channels of said rate setting memory the identification numbers indicating the transmission speeds.

5. The multiplexer control system as claimed in claim 4, wherein said controlling means comprises:

means for decoding the identification number read from said rate setting memory to obtain a decoded identification number;

means for selecting one bit from the bit string indicating the output timings based on the decoded identification number; and means for outputting the output timing signal when the selected one bit indicates that the output timing exists.

6. The multiplexer control system as claimed in claim 5, which further comprises a multiplexer, coupled to said controlling means, multiplexing the input data of the plurality of channels based on the output timing signals from said controlling means.

* * * * *